(12) United States Patent
Janson et al.

(10) Patent No.: US 9,638,291 B2
(45) Date of Patent: May 2, 2017

(54) MULTI-SPEED TRANSMISSION

(71) Applicant: FORD GLOBAL TECHNOLOGIES, LLC, Dearborn, MI (US)

(72) Inventors: David Allen Janson, Plymouth, MI (US); Donald Edward Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/801,286

(22) Filed: Jul. 16, 2015

(65) Prior Publication Data
US 2015/0323046 A1  Nov. 12, 2015

Related U.S. Application Data

(62) Division of application No. 13/922,282, filed on Jun. 20, 2013, now Pat. No. 9,109,669.

(51) Int. Cl.
*F16H 3/44* (2006.01)
*F16H 3/66* (2006.01)
*F16H 3/62* (2006.01)

(52) U.S. Cl.
CPC ............... *F16H 3/666* (2013.01); *F16H 3/62* (2013.01); *F16H 3/66* (2013.01); *F16H 2200/006* (2013.01); *F16H 2200/0086* (2013.01); *F16H 2200/201* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 6,860,831 B2 | 3/2005 | Ziemer | |
| 6,910,985 B2* | 6/2005 | Ishimaru | F16H 3/66 475/271 |
| 6,935,985 B2* | 8/2005 | Ishimaru | F16H 3/663 475/275 |
| 7,052,431 B2* | 5/2006 | Taguchi | F16H 3/663 475/284 |
| 7,235,032 B2 | 6/2007 | Thomas | |
| 7,264,085 B2* | 9/2007 | Ikeda | F16H 3/663 184/6.12 |
| 7,294,089 B2 | 11/2007 | Thomas | |
| 7,628,723 B2 | 12/2009 | Bauknecht | |
| 7,651,432 B2* | 1/2010 | Bauknecht | F16H 3/663 475/284 |

(Continued)

OTHER PUBLICATIONS

Benford, Howard L. and Leising, Maurice B., The Lever Analogy: A New Tool in Transmission Analysis, Chrysler Corp., SAE 810102, 1982.

*Primary Examiner* — Dirk Wright
(74) *Attorney, Agent, or Firm* — James Dottavio; Brooks Kushman P.C.

(57) ABSTRACT

A family of transmission gearing arrangements provides a plurality of forward speed ratios and one or more reverse speed ratios by selective engagement of shift elements in various combinations. Three simple planetary gear sets are located on the input axis. One of the simple planetary gear sets may have either a split-ring arrangement in which two ring gears are provided with one carrier and one sun gear, or a split-sun arrangement in which two sun gears are provided with one carrier and one ring gear.

7 Claims, 4 Drawing Sheets

(56) References Cited

U.S. PATENT DOCUMENTS

| | | | |
|---|---|---|---|
| 7,670,248 B2 | 3/2010 | Bauknecht | |
| 7,670,249 B2 * | 3/2010 | Thomas | F16H 3/663 475/275 |
| 7,678,008 B2 * | 3/2010 | Bauknecht | F16H 3/663 475/275 |
| 7,766,785 B2 | 8/2010 | Thomas | |
| 8,246,504 B2 | 8/2012 | Gumpoltsberger et al. | |
| 8,647,227 B2 * | 2/2014 | Park | F16H 3/666 475/275 |
| 9,109,669 B2 * | 8/2015 | Janson | F16H 3/66 |
| 2002/0183154 A1 | 12/2002 | Ziemer | |
| 2003/0054915 A1 | 3/2003 | Raghavan et al. | |
| 2003/0054917 A1 | 3/2003 | Raghavan et al. | |
| 2003/0060322 A1 | 3/2003 | Raghavan et al. | |
| 2003/0186775 A1 | 10/2003 | Ishimasu et al. | |
| 2004/0048716 A1 | 3/2004 | Ziemer | |
| 2008/0045372 A1 | 2/2008 | Bauknecht | |
| 2010/0125017 A1 | 5/2010 | Thomas | |
| 2012/0004068 A1 * | 1/2012 | Park | F16H 3/663 475/284 |

\* cited by examiner

MULTI-SPEED TRANSMISSION

CROSS-REFERENCE TO RELATED APPLICATIONS

This application is a division of U.S. application Ser. No. 13/922,282 filed Jun. 20, 2013, now U.S. Pat. No. 9,109,699 issued Aug. 18, 2015, the disclosure of which is hereby incorporated in its entirety by reference herein.

TECHNICAL FIELD

The present disclosure generally relates to automatic transmission for motor vehicles. More specifically, the present disclosure relates to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input driven by an engine crankshaft, often via a launch device such as a torque converter, and an output driving the vehicle wheels, often via a differential assembly which permits the left and right wheel to rotate at slightly different speeds as the vehicle turns. In front wheel drive vehicles with transverse mounted engines, the engine crankshaft axis is typically offset from the axle axis.

A common type of automatic transmission utilizes a collection of clutches and brakes. Various subsets of the clutches and brakes are engaged to establish the various speed ratios. A common type of clutch utilizes a clutch pack having separator plates splined to a housing and interleaved with friction plates splined to a rotating shell. When the separator plates and the friction plates are forced together, torque may be transmitted between the housing and the shell. Typically, a separator plate on one end of the clutch pack, called a reaction plate, is axially held to the housing. A piston applies axial force to a separator plate on the opposite end of the clutch pack, called a pressure plate, compressing the clutch pack. The piston force is generated by supplying pressurized fluid to a chamber between the housing and the piston. For a brake, the housing may be integrated into the transmission case. For a clutch, the housing rotates. As the pressurized fluid flows from the stationary transmission case to the rotating housing, it may need to cross one or more interfaces between components rotating at different speeds. At each interface, seals direct the flow from an opening in one component into an opening in the interfacing component.

SUMMARY

According to one embodiment, a transmission comprises an input, an output, simple planetary gear sets, and shift elements. A first simple planetary gear set includes a first sun gear, a first carrier, and a first ring gear. The first sun gear is fixedly coupled to the input. A second simple planetary gear set includes a second sun gear, a second carrier fixedly coupled to the output, and a second ring gear. A third simple planetary gear set includes a third sun gear fixedly coupled to the second sun gear, a third carrier, and a third ring gear fixedly coupled to the output. A first shift element is configured to selectively couple the first carrier to the second ring gear. A third shift element is configured to selectively hold the second sun gear and third sun gear against rotation. A fifth shift element is configured to selectively couple the input to the third carrier. In additional embodiments, a second shift element is configured to selectively couple the first carrier to the second sun gear and third sun gear. A fourth shift element is configured to selectively hold the third carrier against rotation. A sixth shift element is configured to selectively couple the input to the second sun gear and third sun gear.

According to another embodiment, a transmission comprises an input, an output, simple planetary gear sets, and shift elements. A first simple planetary gear set includes a first sun gear fixedly coupled to the input, a first carrier, a first ring gear, a fourth ring gear, and at least one planet gear supported for rotation with respect to the first carrier and meshing with the first sun gear, the first ring gear, and the fourth ring gear. A second simple planetary gear set includes a second sun gear, a second carrier fixedly coupled to the output, and a second ring gear. A third simple planetary gear set includes a third sun gear fixedly coupled to the second sun gear, a third carrier, and a third ring gear fixedly coupled to the output. A first shift element is configured to selectively couple the first carrier to the second ring gear. A third shift element is configured to selectively couple the fourth ring gear to the second sun gear and third sun gear. A fifth shift element is configured to selectively couple the input to the third carrier.

According to yet another embodiment, a transmission comprises an input, an output, simple planetary gear sets, and shift elements. A first simple planetary gear set includes a first sun gear, a first carrier, and a first ring gear, and at least one planet gear supported for rotation with respect to the first carrier and meshing with the first sun gear and the first ring gear. A second simple planetary gear set includes a second sun gear, a second carrier fixedly coupled to the output, and a second ring gear. A third simple planetary gear set includes a third sun gear fixedly coupled to the second sun gear, a fourth sun gear, a third carrier, a third ring gear fixedly coupled to the output, and at least one planet gear supported for rotation with respect to the third carrier and meshing with the third sun gear, the fourth sun gear and the third ring gear. A first shift element is configured to selectively couple the first carrier to the second ring gear. A third shift element is configured to selectively hold the fourth sun gear against rotation. A fifth shift element is configured to selectively couple the input to the third carrier.

DETAILED DESCRIPTION

Figure 1A:
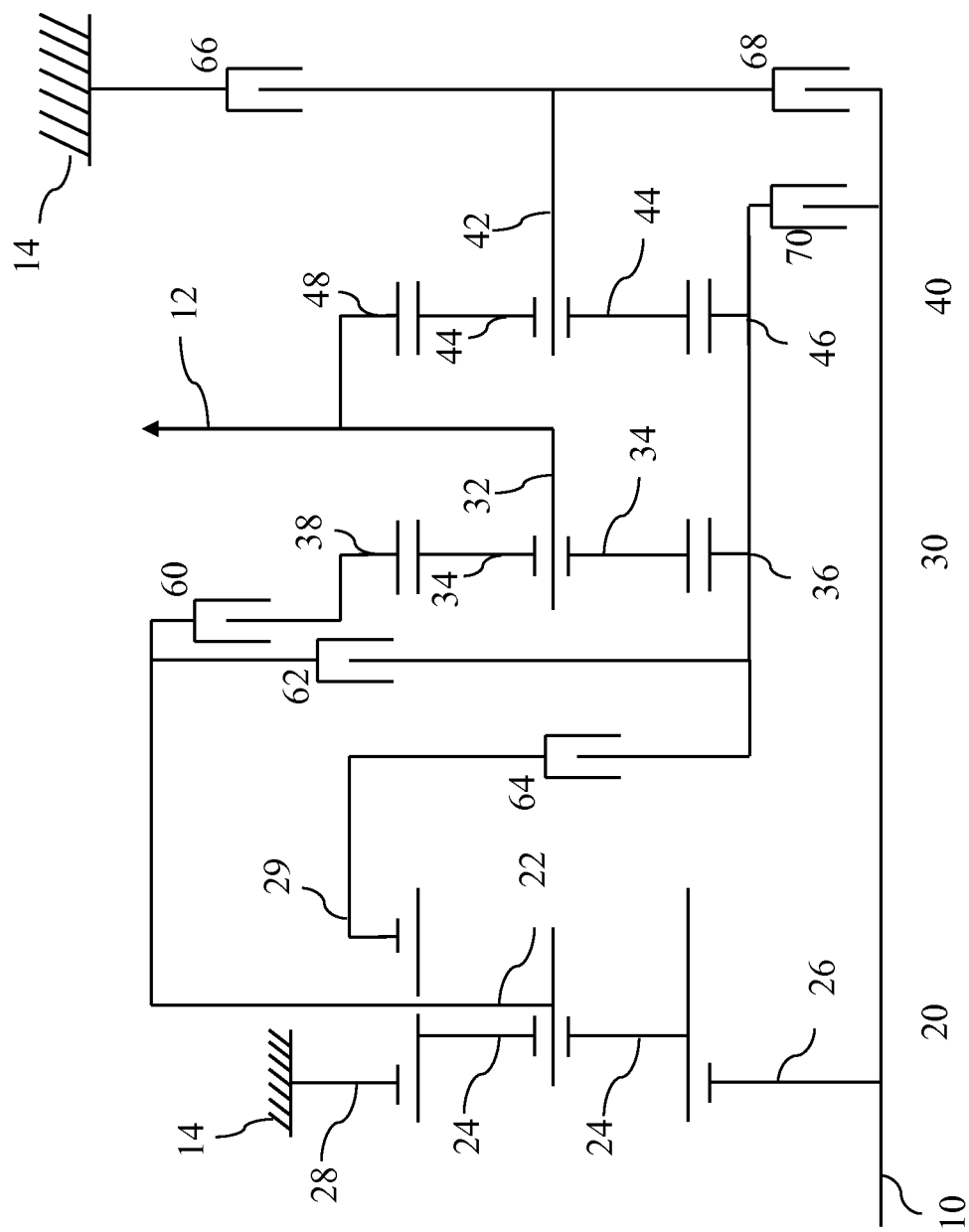
FIG. 1A is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A proportional speed relationship between two elements exists when the ratio between the speeds of the elements is a predetermined value. A proportional speed relationship between a first element and a second element is an overdrive relationship if the second element always rotates faster than and in the same direction as the first element. Similarly, a proportional speed relationship between a first element and a second element is an underdrive relationship if the second element always rotates slower than and in the same direction as the first element.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An element is a transmission input if it is adapted to be fixedly coupled to either a power source or the output of a launch device. A power source may be, for example, an internal combustion engine or an electric motor. A launch device may be, for example, a torque converter or a launch clutch. The input may be coupled to the power source or launch device via a damper designed to absorb torsional vibrations. An element is a transmission output if it is adapted to transmit power to components outside the transmission such as vehicle wheels. There may be a fixed speed ratio other than 1:1 between the output element and the driven component.

An example transmission is schematically illustrated in FIG. 1A. In this transmission, input 10 is driven by the engine, preferably via a launch device such as a torque converter or launch clutch. Output 12 transmits rotational torque out of the transmission and towards a differential, for example. An additional gear or sprocket (not shown) transmits power from the output to the differential which is located on a third axis.

The transmission of FIG. 1A utilizes three simple planetary gear sets 20, 30, and 40. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28, 29. The sun gear and ring gear are supported to rotate about the same axis as the carrier. A simple planetary gear set imposes a fixed speed relationship. The speed of the carrier is constrained to be between the speed of the sun gear and the speed of the ring gear. More specifically, the speed of the carrier is a weighted average of the speed of the sun gear and the speed of the ring gear with weighting factors determined by the number of teeth on each gear. Similar speed relationships are imposed by other known types of fixed gearing arrangements that may be implemented in other exemplary embodiments of the present disclosure. For example, a double pinion planetary gear set constrains the speed of the ring gear to be a weighted average between the speed of the sun gear and the speed of the carrier. Gear sets 30 and 40 are similarly structured, each with respective planet carriers 32, 42, planet gears 34, 44, sun gears 36, 46, and ring gears 38, 48.

Figure 2A:
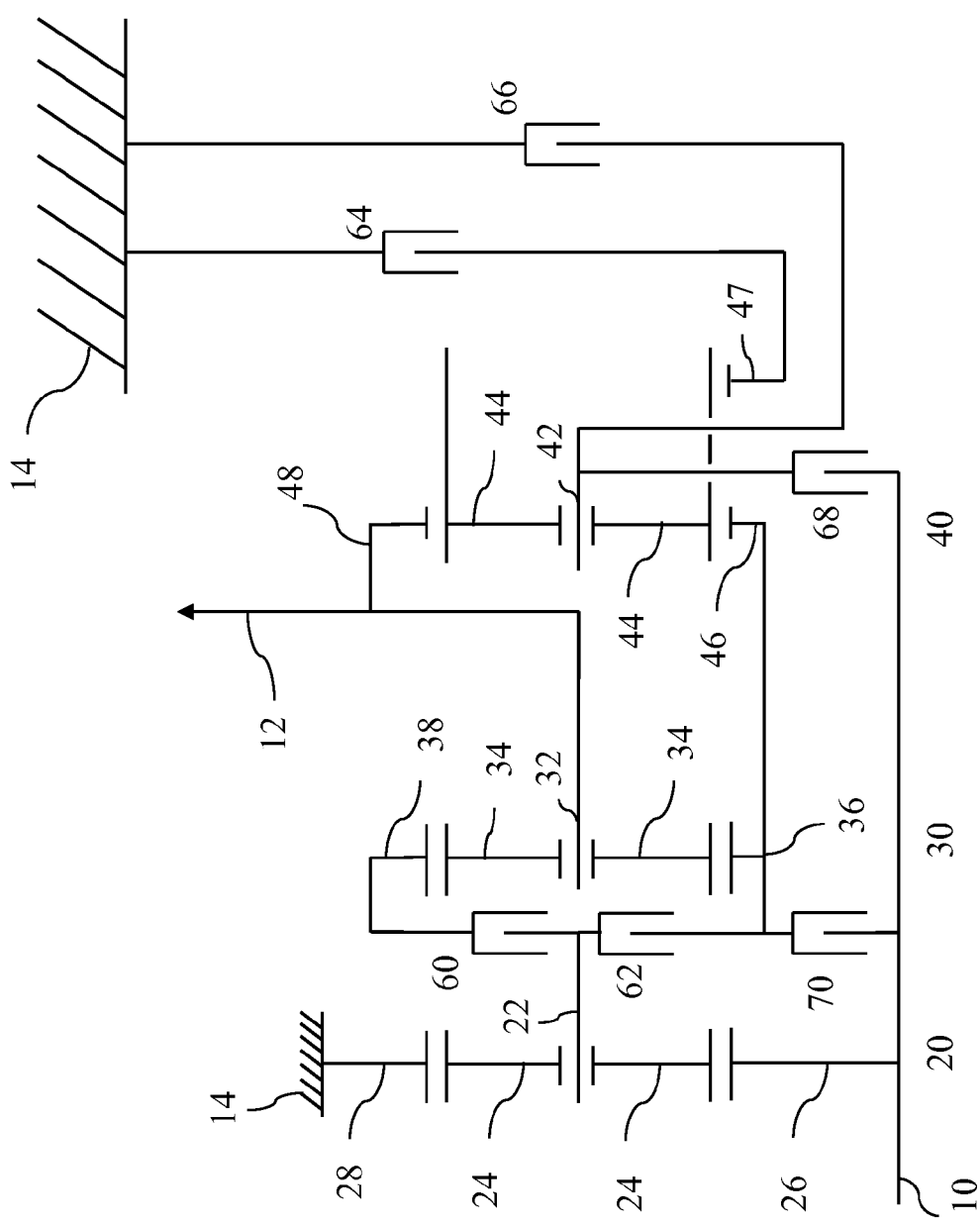
FIG. 2A is a schematic diagram of a third transmission gearing arrangement.
Figure 2B:
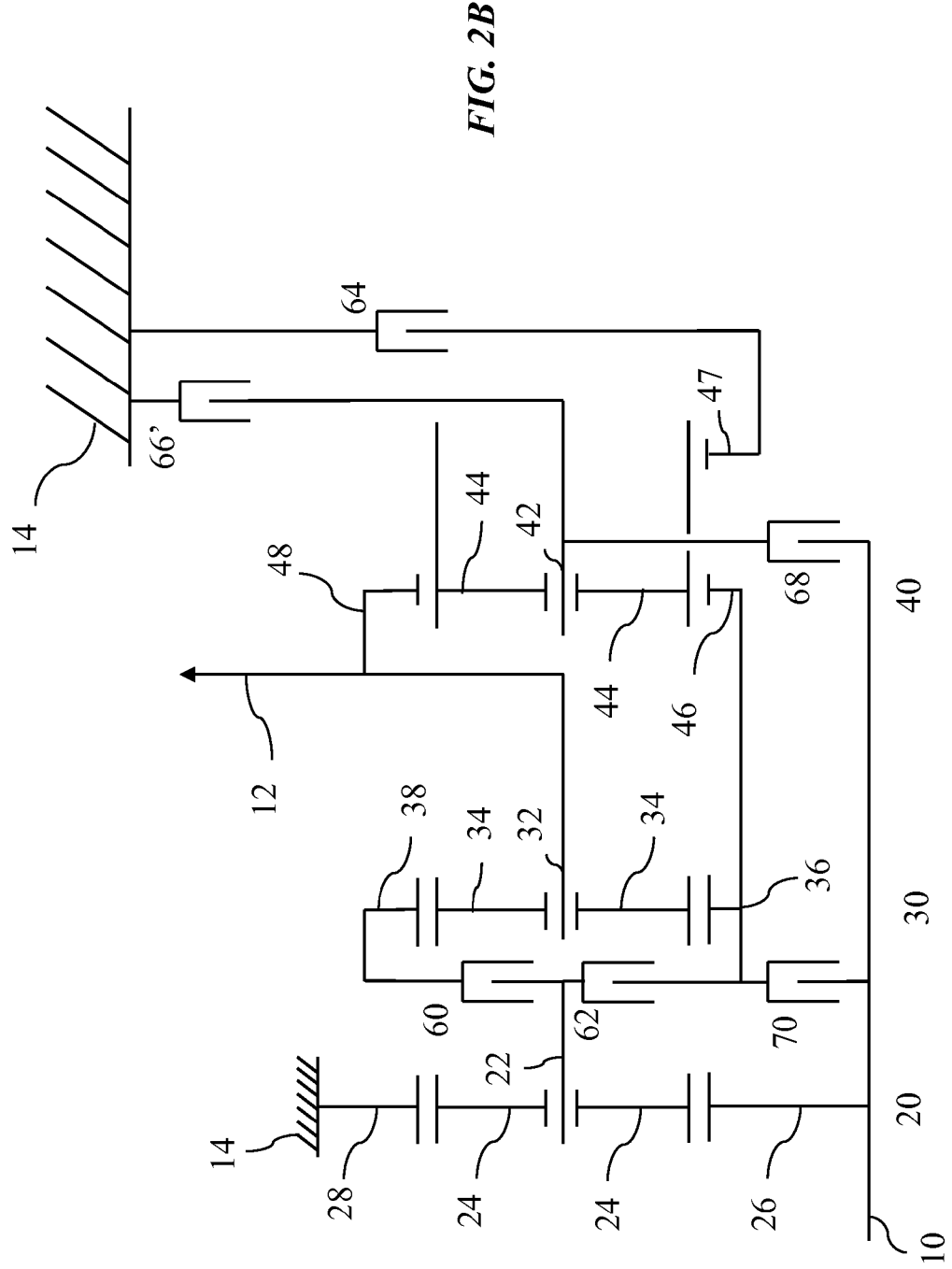
FIG. 2B is a schematic diagram of a fourth transmission gearing arrangement.

Unlike gear sets 30 and 40, gear set 20 is illustrated as having a split-ring gear set arrangement in which two identical gear sets may be fused or otherwise mated with one another such that they share the same gears while maintaining two separate and individual ring gears. A split-ring gear set arrangement may be utilized in any of the gear sets 20, 30, or 40. FIGS. 2A-B (as explained below) utilizes a split-sun gear set arrangement with gear set 40 in which gear set 40 includes one ring gear, one carrier, and two separate sun gears. It should be understood that two separate planetary gear sets may be utilized instead of the split-ring or split-sun gear set arrangements.

A suggested ratio of gear teeth for each planetary gear set is listed in Table 1, below.

TABLE 1

| Ring 28/Sun 26 | 1.483 |
|---|---|
| Ring 38/Sun 36 | 3.114 |
| Ring 48/Sun 46 | 2.512 |

Input 10 is fixedly coupled to sun gear 26. Ring gear 28 is fixedly coupled to the transmission case 14 and is therefore grounded or otherwise held against rotation. This, in turn, holds ring gear 29 against rotation. Sun gear 36 is fixedly coupled to sun gear 46. Carrier 32 is fixedly coupled to ring gear 48 and both are in turn fixedly coupled to output 12.

Several shift elements such as clutches and brakes are utilized throughout the transmission to selectively couple various elements of the planetary gear sets and/or selectively hold the various elements against rotation. For example, carrier 22 is configured to be selectively coupled to ring gear 38 by clutch 60. Carrier 22 is also selectively coupled to sun gears 36 and 46 by clutch 62. Ring gear 29 is selectively coupled to sun gears 36 and 46 by clutch 64. In one embodiment, clutch 64 being activated and engaged couples ring gear 29 to sun gears 36 and 46, which holds sun gears 36 and 46 against rotation because ring gear 29 is effectively coupled to the transmission case 14 through planet gear(s) 24 and ring gear 28. In another embodiment, such as a stepped ring gear arrangement, ring gear 29 is not on the same plane as ring gear 28, and therefore ring gear 29 is not held against rotation due to grounded ring gear 28. Carrier 42 is selectively held against rotation by brake 66. Input 10 is selectively coupled to carrier 42 by clutch 68, and is selectively coupled to the sun gears 36 and 46 by clutch 70.

Figure 1B:
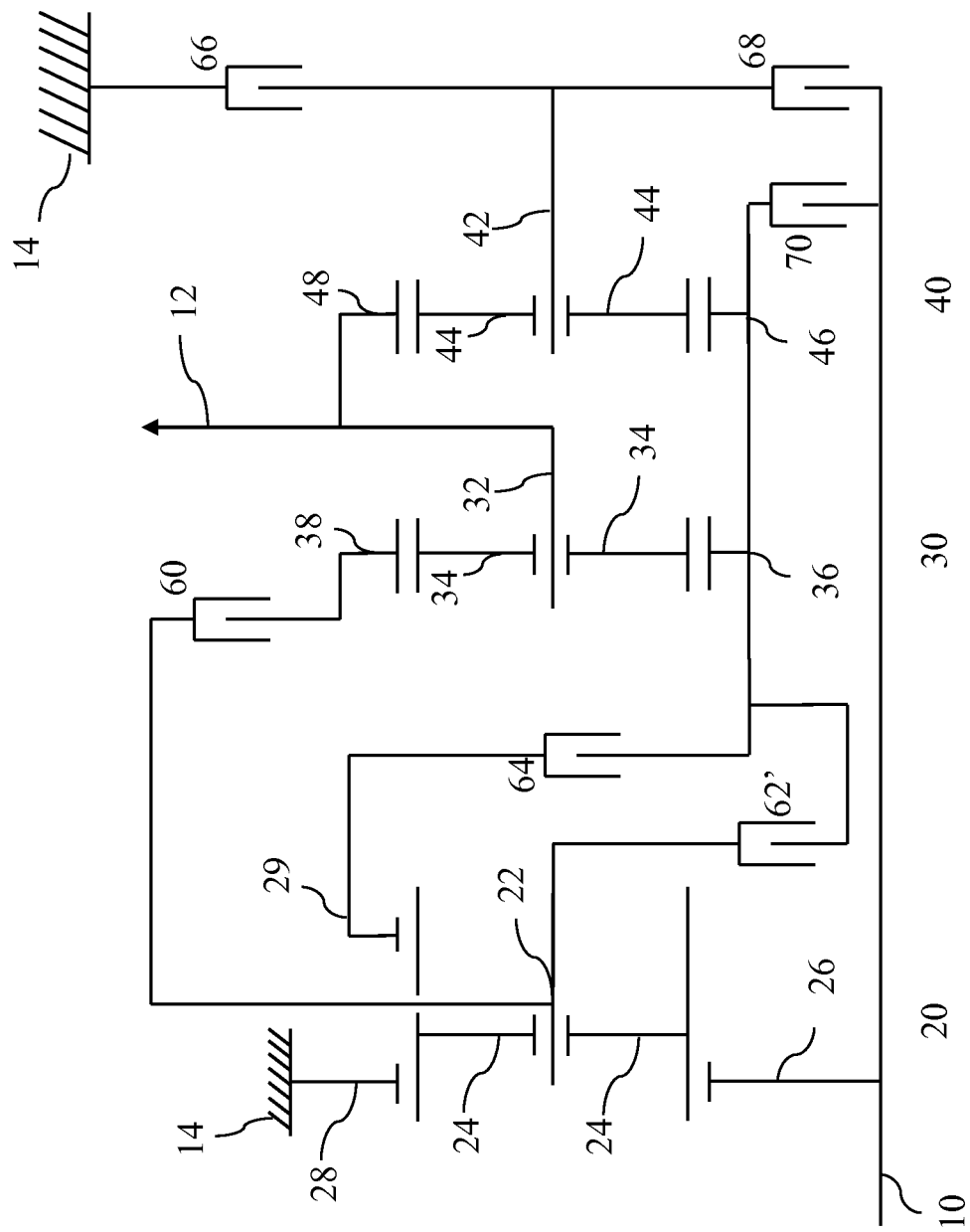
FIG. 1B is a schematic diagram of a second transmission gearing arrangement.

As illustrated and discussed in FIG. 1A-1B, gear set 20 utilizes a split-ring gear set arrangement. A single pinion is utilized to constrain ring gear 29 to the same speed as ring gear 28. Since ring gear 28 is held against rotation by being fixedly coupled to the transmission case 14, ring gear 29 is also effectively held against rotation. The carrier 22 is able to be selectively coupled to other portions of the remaining gear sets 30, 40 via a connection or shaft extending between the split rings 28, 29. In such a configuration, the packaging of three or more clutches between gear sets 20 and 30 is improved due to the carrier 22 being accessed through the split rings 28, 29.

As shown in Table 2 below, engaging shift elements in combinations of two establishes eight forward speed ratios and two reverse speed ratios between input 10 and output 12. An "X" indicates that the shift element is required to establish the speed ratio. When the gear sets have tooth numbers as indicated in Table 1, the speed ratios have the values indicated in Table 2.

TABLE 2

|  | 60 | 62 | 64 | 66 | 68 | 70 | Ratio | Step |
|---|---|---|---|---|---|---|---|---|
| 1$^{st}$ Rev |  | X |  | X |  |  | −6.237 | 118.1% |
| 2$^{nd}$ Rev |  |  |  | X |  | X | −2.512 | 2.483 |
| 1$^{st}$ | X |  |  | X |  |  | 5.283 |  |
| 2$^{nd}$ | X |  | X |  |  |  | 3.280 | 1.611 |
| 3$^{rd}$ | X | X |  |  |  |  | 2.483 | 1.321 |
| 4$^{th}$ | X |  |  |  |  | X | 1.825 | 1.360 |
| 5$^{th}$ | X |  |  |  | X |  | 1.390 | 1.313 |
| 6$^{th}$ |  |  |  |  | X | X | 1.000 | 1.390 |
| 7$^{th}$ |  |  | X |  | X |  | 0.808 | 1.238 |
| 8$^{th}$ |  |  |  | X | X |  | 0.715 | 1.130 |

While an 8-speed transmission is exemplified in Table 2 along with the description provided above, it should be understood that a 6-speed transmission can be achieved by removing, for example, clutch 70. Other such alterations to the 8-speed transmission are contemplated, and the 8-speed configuration is merely exemplary.

FIG. 1B illustrates an exemplary transmission similar to that of FIG. 1A. In FIG. 1B, clutch 62 has been replaced with clutch 62'. Instead of connecting to the carrier 22 via an intermediate shaft that extends through the two rings gears 28, 29 (as is the case with clutch 62 in FIG. 1A), clutch 62' connects to the carrier 22 at a location more toward the input 10. In this fashion, the carrier 22 is selectively coupled to the sun gears 36, 46 via a connection that does not pass through the ring gears 28, 29. Such an arrangement may be beneficial for packaging reasons to reduce the size of the transmission, or for influencing the amount of drag forces throughout the transmission.

FIGS. 2A-2B show other exemplary gearing arrangements. Gear set 40 now includes a split-sun gear set arrangement in which two sun gears 46, 47 are provided on one simple planetary gear set having a singular carrier and singular ring gear. This allows brake 66 to couple with the carrier 42 by a shaft extending between the sun gears 46, 47. The benefits achieved with a split-sun gear arrangement are similar to that of the split-ring gear arrangement described with reference to gear set 20 of FIGS. 1A-1B.

A suggested ratio of gear teeth for each planetary gear set is again listed in Table 1, above. Similarly, the gear shift table as illustrated in Table 2 can be applied to the transmission gearing arrangements of FIGS. 2A-2B.

Fixed connections are provided in FIGS. 2A-2B that are similar to those described in FIGS. 1A-1B. As illustrated in FIGS. 2A-2B, brake 64 is provided in a different location to now selectively hold sun gear 47 against rotational movement, which can operatively hold sun gear 46 against rotational movement. Clutch 66 also selectively holds carrier 42 against rotation by a shaft extending through the sun gears 46, 47. Brake 66' is illustrated in FIG. 2B in an alternative embodiment in which the carrier 42 is selectively held against rotation via a shaft that does not extend through the sun gears 46, 47.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
    an input;

an output;
a first simple planetary gear set having a first sun gear fixedly coupled to the input, a first carrier, and a first ring gear, and at least one planet gear supported for rotation with respect to the first carrier and meshing with the first sun gear and the first ring gear;
a second simple planetary gear set having a second sun gear, a second carrier fixedly coupled to the output, and a second ring gear;
a third simple planetary gear set having a third sun gear fixedly coupled to the second sun gear, a fourth sun gear, a third carrier, and a third ring gear fixedly coupled to the output;
a first shift element configured to selectively couple the first carrier to the second ring gear;
a third shift element configured to selectively hold the fourth sun gear against rotation; and
a fifth shift element configured to selectively couple the input to the third carrier.

2. The transmission of claim 1 further comprising:
a second shift element configured to selectively couple the first carrier to the second sun gear and third sun gear.

3. The transmission of claim 1 further comprising:
a fourth shift element configured to selectively hold the third carrier against rotation.

4. The transmission of claim 1 further comprising:
a sixth shift element configured to selectively couple the input to the second sun gear and third sun gear.

5. The transmission of claim 1, wherein the first ring gear is held against rotation.

6. A transmission comprising:
an input;
an output;
a first simple planetary gear set having a first sun gear, a first carrier, a first ring gear held against rotation, and at least one planet gear supported for rotation with respect to the first carrier and meshing with the first sun gear and the first ring gear;
a second simple planetary gear set having a second sun gear, a second carrier fixedly coupled to the output, and a second ring gear;
a third simple planetary gear set having a third sun gear fixedly coupled to the second sun gear, a fourth sun gear, a third carrier, and a third ring gear fixedly coupled to the output;
a first shift element configured to selectively couple the first carrier to the second ring gear;
a third shift element configured to selectively hold the fourth sun gear against rotation; and
a fifth shift element configured to selectively couple the input to the third carrier.

7. The transmission of claim 6, wherein the first sun gear is fixedly coupled to the input.

* * * * *